United States Patent
Ahuja et al.

(10) Patent No.: US 10,135,810 B2
(45) Date of Patent: Nov. 20, 2018

(54) SELECTIVE AUTHENTICATION SYSTEM

(71) Applicant: ADP, LLC, Roseland, NJ (US)

(72) Inventors: Sanjoli Ahuja, Bridgewater, NJ (US); Michael Justin Brauman, Westfield, NJ (US); Hanwoong Darren Cho, Summit, NJ (US); Brenda Jane Kosovan, Fanwood, NJ (US); Francisco Villavicencio, Tenafly, NJ (US)

(73) Assignee: ADP, LLC, Roseland, NJ (US)

( * ) Notice: Subject to any disclaimer, the term of this patent is extended or adjusted under 35 U.S.C. 154(b) by 181 days.

(21) Appl. No.: 15/354,155

(22) Filed: Nov. 17, 2016

(65) Prior Publication Data

US 2018/0139199 A1 May 17, 2018

(51) Int. Cl.
*H04L 29/06* (2006.01)
*H04L 29/08* (2006.01)

(52) U.S. Cl.
CPC ............ *H04L 63/083* (2013.01); *H04L 67/02* (2013.01); *H04L 67/306* (2013.01); *H04L 63/108* (2013.01)

(58) Field of Classification Search
CPC ..... H04L 63/083; H04L 67/02; H04L 67/306; H04L 63/20
See application file for complete search history.

(56) References Cited

U.S. PATENT DOCUMENTS

| | | | |
|---|---|---|---|
| 6,728,884 B1 | 4/2004 | Lim | |
| 7,016,875 B1 | 3/2006 | Steele et al. | |
| 7,194,547 B2 | 3/2007 | Moreh et al. | |
| 9,426,182 B1* | 8/2016 | Zeljko | H04L 63/20 |
| 2002/0087894 A1* | 7/2002 | Foley | H04L 63/083 726/4 |
| 2002/0144119 A1 | 10/2002 | Benantar | |
| 2007/0044144 A1* | 2/2007 | Knouse | H04L 63/0815 726/8 |
| 2008/0010665 A1* | 1/2008 | Hinton | G06F 21/41 726/1 |

(Continued)

OTHER PUBLICATIONS

Duncan Wong., "An Optimized Authentication Protocol for Mobile Network Reconsidered", Oct. 2002, ACM, pp. 74-76 (Year: 2002).*

*Primary Examiner* — Matthew Smithers
(74) *Attorney, Agent, or Firm* — Yee & Associates, P.C.

(57) ABSTRACT

A method and authentication mechanism is provided. A request is sent to authenticate a user of the application from a mobile device to an authentication server. The authentication server identifies a user profile for the user containing one or more authentication schemes available to authenticate the user. The authentication schemes comprise a direct scheme in which the user provides a password and a federated authentication scheme. The authentication server determines a favored authentication scheme from one or more authentication schemes available based on a policy associated with the user profile. The mobile device displays a menu showing the authentication schemes available to allow the user to select an authentication scheme. The favored authentication scheme is displayed ahead of a remainder of the authentication schemes. The authentication server verifies credentials for the user profile using the selected authentication scheme to authenticate the user.

20 Claims, 6 Drawing Sheets

(56) References Cited

U.S. PATENT DOCUMENTS

| | | | |
|---|---|---|---|
| 2012/0214442 A1* | 8/2012 | Crawford | H04W 12/06 455/411 |
| 2013/0174241 A1* | 7/2013 | Cha | H04L 63/0815 726/7 |
| 2016/0044016 A1 | 2/2016 | Siegel et al. | |
| 2016/0261411 A1* | 9/2016 | Yau | H04L 63/0807 |
| 2017/0374070 A1* | 12/2017 | Shah | H04L 63/20 |

* cited by examiner

SELECTIVE AUTHENTICATION SYSTEM

BACKGROUND INFORMATION

1. Field

The present disclosure relates generally to an improved authentication system for a mobile device and, in particular, to a method and system for authenticating a user on the mobile device when a number of authentication schemes are available.

2. Background

Mobile devices, such as tablet PCs and smart phones, are increasing in popularity and are quickly replacing desktop Personal Computers (PC) in both consumer and business sectors. Mobile devices connected to the Internet allow users to access even the most sensitive information, such as payroll or other financial information, from anywhere a connection to the Internet is available.

Service providers, such as employers, financial institutions, or other entities that provide the information are increasingly challenged to maintain and secure the user's information. Each service provider may have different requirements for how the user accesses the information from the provider's servers. For example, the user often has an account with each service provider, and logs into the servers with a unique username and password associated with the account. But creating a unique username and password for each service provider is cumbersome because the user may become overwhelmed (e.g., the user often forgets the username or password), thus creating frustration and delay.

Federated authentication schemes at least partially alleviate the requirement for the unique username and password for each account. Federated authentication provides a flexible approach that allows a third party to verify the user's identity. For example, the federated authentication may also include a single sign-on feature. Accordingly, the user only has to remember the username and password associated with the third party. However, the user may not be aware that such an option is available to use. Security and policy considerations may also limit the use of these types of federated authentication schemes.

It would be desirable to have a method and apparatus that take into account at least some of the issues discussed above, as well as other possible issues. For example, it would be desirable to have a method and apparatus that overcome a technical problem with identifying the user when different authentication schemes are available, and assisting the user with navigating through the options available in an efficient manner.

SUMMARY

An embodiment of the present disclosure provides a method of optimizing authentication for an application on a mobile device. A request is sent to authenticate a user of the application from the mobile device to an authentication server. The authentication server identifies a user profile for the user containing one or more authentication schemes available to authenticate the user. The authentication schemes comprise a direct authentication scheme in which the user provides a username and a password, and a federated authentication scheme. The authentication server determines a favored authentication scheme from one or more of the authentication schemes available based on a policy associated with the user profile. The mobile device displays a menu showing the authentication schemes available to allow the user to select an authentication scheme. The favored authentication scheme is displayed ahead of a remainder of the authentication schemes. The authentication server verifies credentials for the user profile using the selected authentication scheme to authenticate the user.

Another embodiment of the present disclosure provides an authentication mechanism for authenticating a user using a favored authentication scheme from among options comprising a direct authentication scheme and a federated authentication scheme. A mobile device is configured to send a request to authenticate the user to an authentication server. The authentication server is configured to identify a user profile for the user containing one or more authentication schemes available to authenticate the user. The authentication schemes comprise the direct authentication scheme in which the user provides a username and a password and the federated authentication scheme. The favored authentication scheme is determined from one or more of the authentication schemes available based on a policy associated with the user profile. The mobile device is configured to display a menu showing the authentication schemes available and allow the user to select an authentication scheme. The favored authentication scheme is displayed ahead of a remainder of authentication schemes. The authentication server is configured to verify credentials for the user profile using the selected authentication scheme to authenticate the user The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current methodologies for identifying a user are not as efficient as desired. The illustrative embodiments also recognize and take into account that a user can have multiple user identities and user accounts for various service providers. The illustrative embodiments recognize and take into account that there may be different ways, or different authentication schemes for verifying the user's credentials. For example, the user may login to a server directly, using a username and a password. Alternatively, the user may login to the server using a federated authentication scheme. The illustrative embodiments recognize and take into account that the user may not be aware that that there are additional or different authentication schemes available.

Additionally, the illustrative embodiments recognize and take into account that the user often uses a mobile device. The mobile device has a lock-screen and an inherit local authentication mechanism to unlock the mobile device. For example, the illustrative embodiments recognize that the mobile device may include biometric sensors.

The illustrative embodiments also recognize and take into account that the user may also use a personal computer (PC) or computer system. The computer system may be preferred to authenticate the user because the computer system includes a display and keyboard.

The illustrative embodiments also recognize and take into account that an employer of the user may have a preferred authentication scheme. The illustrative embodiments also recognize and take into account that the user may have a preference on which authentication scheme to use. The illustrative embodiments also recognize that there may be a risk in using a mobile device, such as when the mobile device is used on an unsecure connection or internationally. In this example, certain authentication schemes may not be available.

The illustrative embodiments provide a method and authentication mechanism for authenticating a user of an application on a mobile device. In one illustrative example, a menu is displayed on a mobile device. The menu displays authentication schemes that are available to select, and allows the user to select a favored authentication scheme. The favored authentication scheme is presented ahead of the remainder of authentication schemes. In various embodiments, the favored authentication scheme is based on a policy associated with the user profile.

Figure 1:
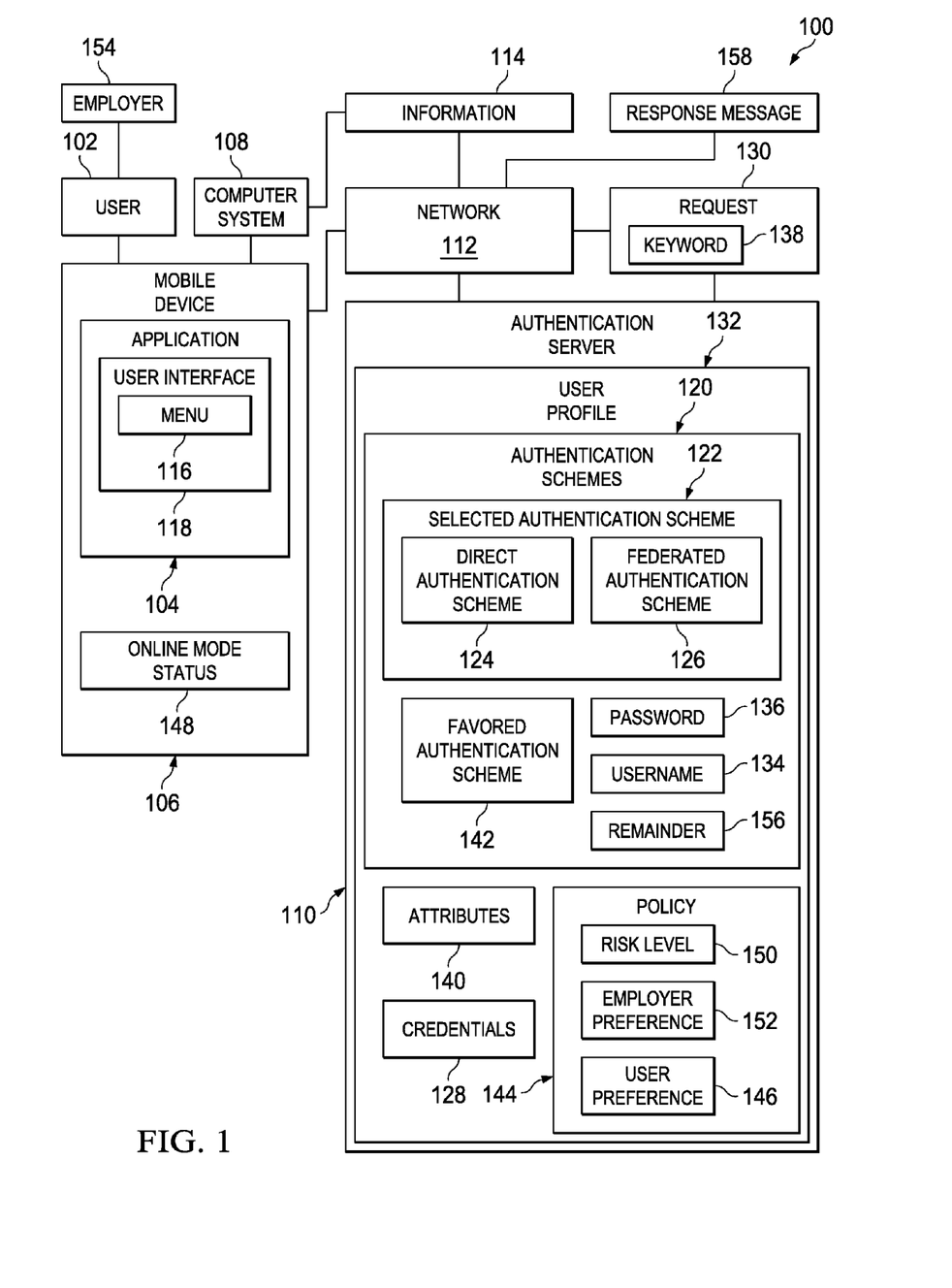
FIG. 1 is an illustration of a block diagram of an authentication mechanism for authenticating a user in accordance with an illustrative embodiment.

With reference now to the figures and, in particular, with reference to FIG. 1, an illustration of a block diagram of an authentication mechanism for authenticating a user is depicted in accordance with an illustrative embodiment. User 102 interacts with application 104 running on mobile device 106. Similarly, user 102 may also use computer system 108 in addition to mobile device 106. In this example, user 102 is a person.

User 102 uses mobile device 106 and computer system 108 to communicate with authentication server 110 in order to authenticate or verify the identity of user 102. Mobile device 106, computer system 108, and authentication server 110 are connected to one another via network 112.

Authentication server 110 may use a number of different authentication schemes 120 to verify the identity of user 102. For example, authentication server 110 may use direct authentication scheme 124 that uses password 136 or federated authentication scheme 126, as discussed below. A number, as used herein with reference to an item, means one or more items.

Mobile device 106 comprises physical hardware that is portable, such as a hand-held device. For example, mobile device 106 includes at least one of a laptop computer, a tablet, a mobile phone, such as a cellular or smart phone, or any other suitable type of portable data processing system that can access information 114 over a network, such as network 112.

Computer system 108 comprises physical hardware such as a desktop computer. For example, computer system 108 includes at least one of a laptop computer, a tablet, a desktop computer, or any other type of computer system that can access information over a network, such as network 112.

Authentication server 110 comprise physical hardware and may include at least one of server computers, web servers, proxy servers, file transfer protocol servers, workstations, personal computers, laptop computers, tablets, mobile phones, or any other type of data processing system that can verify the identity of user 102. Authentication server 110 may also be referred to herein as an "identity provider."

Network 112 is a communication medium and may include one or more wireless or wired data networks. Network 112 may include one or more of a wireless cellular data network, a local area network, a wide area network, the Internet, an intranet, or other suitable types of networks. For example, mobile device 106 may use a wireless cellular data network, such a code division multiple access (CDMA) or a global system for mobiles (GSM) to access the Internet. Authentication server 110 may access the Internet via a wired link. In this manner, mobile device 106 is in communication with authentication server 110 via network 112.

Application 104 is configured to run on mobile device 106, computer system 108, or both. Application 104 may include at least one of a browser, a mobile application, or some other suitable type of application that is configured to receive and display information 114 and interact with user 102.

Information 114, as used herein, comprises any information that is related to user 102. Information 114 is sensitive information such that user 102 may discourage dissemination or disclosure of information 114 to a third party. For example, information 114 may be personal financial information for user 102. For example, information 114 may include at least one of payroll information, tax information, salary information, a social security number, or other types of personal information.

Application 104 displays menu 116 on user interface 118 to allow user 102 to interact with application 104. User interface 118 is configured to allow user 102 to enter user credentials 128 to allow user 102 to login to authentication server 110. Credentials 128, as used herein, refers to one or more of a username or a password. After the identity of user 102 is verified, the user 102 may then retrieve or view information 114.

Menu 116 is designed to show a list of authentication schemes 120 that are available to user 102 to complete the login process. Application 104 allows user 102 to pick selected authentication scheme 122 that is one of the authentication schemes in authentication schemes 120, discussed in more detail below. For example, menu 116 may present an option to use direct authentication scheme 124 or federated authentication scheme 126, although other authentication schemes may be available. Application 104 sends request 130 to authentication server 110 to authenticate user 102 using selected authentication scheme 122.

Request 130 includes at least one keyword 138 provided by user 102 that identifies user 102. User 102 enters keyword 138 using user interface 118. Keyword 138 is sent to authentication server 110. Keyword 138 includes one or more of a name, a username, an email address, a name of an employer, a client identifier, a company registration code, or other type of element that can be used to uniquely identify user 102. Keyword 138 may be a portion of the element, for example, keyword 138 may be a string of characters comprising a domain of an email address. As another example, keyword 138 may be a portion of the name of the employer. In other words, keyword 138 may be an incomplete portion of element used to uniquely identify user 102.

Authentication server 110 identifies user profile 132 associated with user 102 upon receiving request 130. User profile 132 includes attributes 140 that are associated with user 102. Attributes 140 may include keyword 138 or portions of keyword 138. Authentication server 110 compares keyword 138 received from user 102 with attributes 140 to identify user profile 132 as being associated with user 102. For example, user 102 may not be aware of a username associated with user profile 132. In this example, user 102 knows a first name, last name, and an employer name, which user 102 provides as keyword 138 in request 130. Authentication server 110 then compares keyword 138 with attributes 140 to determine if a particular user profile, such as user profile 132, is associated with user 102.

User profile 132 comprises one or more authentication schemes 120 that are available to authenticate user 102. Authentication schemes 120 include direct authentication scheme 124 and federated authentication scheme 126. In various embodiments, authentication schemes 120 may include other authentication schemes such as a token, a certificate, or a single sign-on based scheme.

Direct authentication scheme 124 comprises username 134 and password 136 associated with user profile 132. Under direct authentication scheme 124, a successful verification of user 102 occurs when a username and a password provided by user 102 via user interface 118 matches username 134 and password 136, respectively, stored on authentication server 110 as part of user profile 132.

Federated authentication scheme 126 is a scheme in which an identity provider verifies the identity of user 102 on behalf of authentication server 110. In this case, authentication server 110 may be referred to as a service provider. Federated authentication scheme 126 includes a number of different identity providers that are in communication with authentication server 110. In other words, one or more different identity providers may be used to verify credentials 128 of user 102.

For example, in operation, user 102 is not required to have credentials 128 with authentication server 110. For example, user 102 does not provide a password stored on authentication server 110. Instead, user 102 provides credentials 128 to the identity provider. Federated authentication scheme 126 does not require authentication server 110 to know a password associated with user 102, and may be referred to as a "password-less" login scheme. Instead, one of the identity providers verifies the identity of user 102 on behalf of authentication server 110, and relays a message to authentication server 110 upon successful verification of the identity of user 102. In this example, an identity provider may be a "trusted" server for authentication server 110 (e.g., authentication server 110 trusts the results of the identity provider).

Authentication server 110 determines favored authentication scheme 142 from authentication schemes 120 based on policy 144. In other words, authentication server 110 determines which authentication schemes 120 to present to user 102 as being optimal or favored authentication scheme 142.

User profile 132 includes policy 144. Policy 144 governs or ranks authentication schemes 120 to determine which authentication scheme in authentication schemes 120 is favored authentication scheme 142. Policy 144 may be based on one or more of user preference 146, online mode status 148 of mobile device 106, risk level 150, and employer preference 152. For example, policy 144 may weigh the factors and choose an authentication scheme that has the greatest weight.

User preference 146 is a record of an authentication scheme that user 102 has indicated as being preferred. For example, user preference 146 may be a selection to remember a particular authentication scheme. As another example, user preference 146 may be an authentication scheme that was previously selected.

Online mode status 148 indicates whether mobile device 106 is in an offline or online mode. Policy 144 may use online mode status 148 to determine if any of authentication schemes 120 are not available because of a disruption in communication. In the offline mode, communication between mobile device 106 and authentication server 110 is disrupted. For example, mobile device 106 may not be connected to network 112. In the online mode, communication between mobile device 106 and authentication server 110 is established.

Risk level 150 indicates a risk associated with using a particular authentication scheme. Risk level 150 may be based on circumstances such as time of day, geographic location, the quality of network 112, or other factors. For example, the geographic location of mobile device 106 may be ascertained using network 112 or information in request 130. Certain geographic locations may have an elevated level of risk, such as, for example, an international location. As another example, the quality of network 112 may influence risk level 150. In this example, the quality of network 112 is based on signal strength (e.g., latency or a wireless signal strength) or a presence or lack of an encrypted wireless connection.

Employer preference 152 indicates a preference set by employer 154 of user 102. For example, employer 154 may prefer that federated authentication scheme 126 be favored authentication scheme 142, and more specifically a particular identity provider may be preferred.

Authentication server 110 sends response message 158 to mobile device 106. Response message 158 comprises an indication of favored authentication scheme 142.

Mobile device 106 then updates menu 116 so that favored authentication scheme 142 is displayed ahead of a remainder 156 of authentication schemes 120. Remainder 156 of authentication schemes 120 represents authentication schemes in authentication schemes 120 that are not selected as favored authentication scheme 142. For example, authentication schemes 120 may be displayed as a list in menu 116. Favored authentication scheme 142 may then be listed at the top of the list. In other words, favored authentication scheme 142 is displayed before any other of the remaining authentication schemes.

User 102 then chooses selected authentication scheme 122 from the list displayed in menu 116. Application 104 then sends a revised response indicating selected authentication scheme 122 to authentication server 110. Authentication server 110 then verifies credentials 128 of user 102 using selected authentication scheme 122. Once authentication server 110 verifies the identity of user 102, user 102 may access or view information 114.

As used herein, the phrase "at least one of", when used with a list of items, means different combinations of one or more of the listed items may be used, and only one of each item in the list may be needed. In other words, "at least one of" means any combination of items or numbers of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Authentication mechanism 100 may be implemented in software, hardware, firmware, or a combination thereof. When software is used, the operations performed by authentication mechanism 100 may be implemented in program code configured to run on hardware, such as a processor unit. When firmware is used, the operations performed by authentication mechanism 100 may be implemented in program code and data, and stored in persistent memory to run on a processor unit. When hardware is employed, the hardware may include circuits that operate to perform the operations in authentication mechanism 100.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

The computer systems described herein, such as mobile device 106, computer system 108, and authentication server 110 are physical hardware systems and includes one or more data processing systems. When more than one data processing system is present, the data processing systems are in communication with each other using a communications medium. The communications medium may be a network, such network 112, a local area network (LAN), a wide area network (WAN), an intranet, or the Internet. The data processing systems may be selected from at least one of a computer, a server computer, a tablet, or some other suitable type of data processing system.

A technical effect of the embodiments herein includes increased security in the identification of a user. For example, authentication mechanism 100 may promote an authentication scheme using a policy that varies based on a geographic location of mobile device 106. A technical effect of embodiments includes improved functioning of a mobile device. A technical effect of the embodiments includes a simplification of an authentication process. A technical effect of the embodiments includes improved accuracy in identifying a user. A technical effect of the embodiments includes improved security in the operation of a mobile device.

As a result, the computer systems and mobile devices herein operate as special purpose computer systems. For example, application 104 transforms computer system 108 into a special purpose computer system, as compared to currently available general computer systems that do not have application 104.

Figure 2:
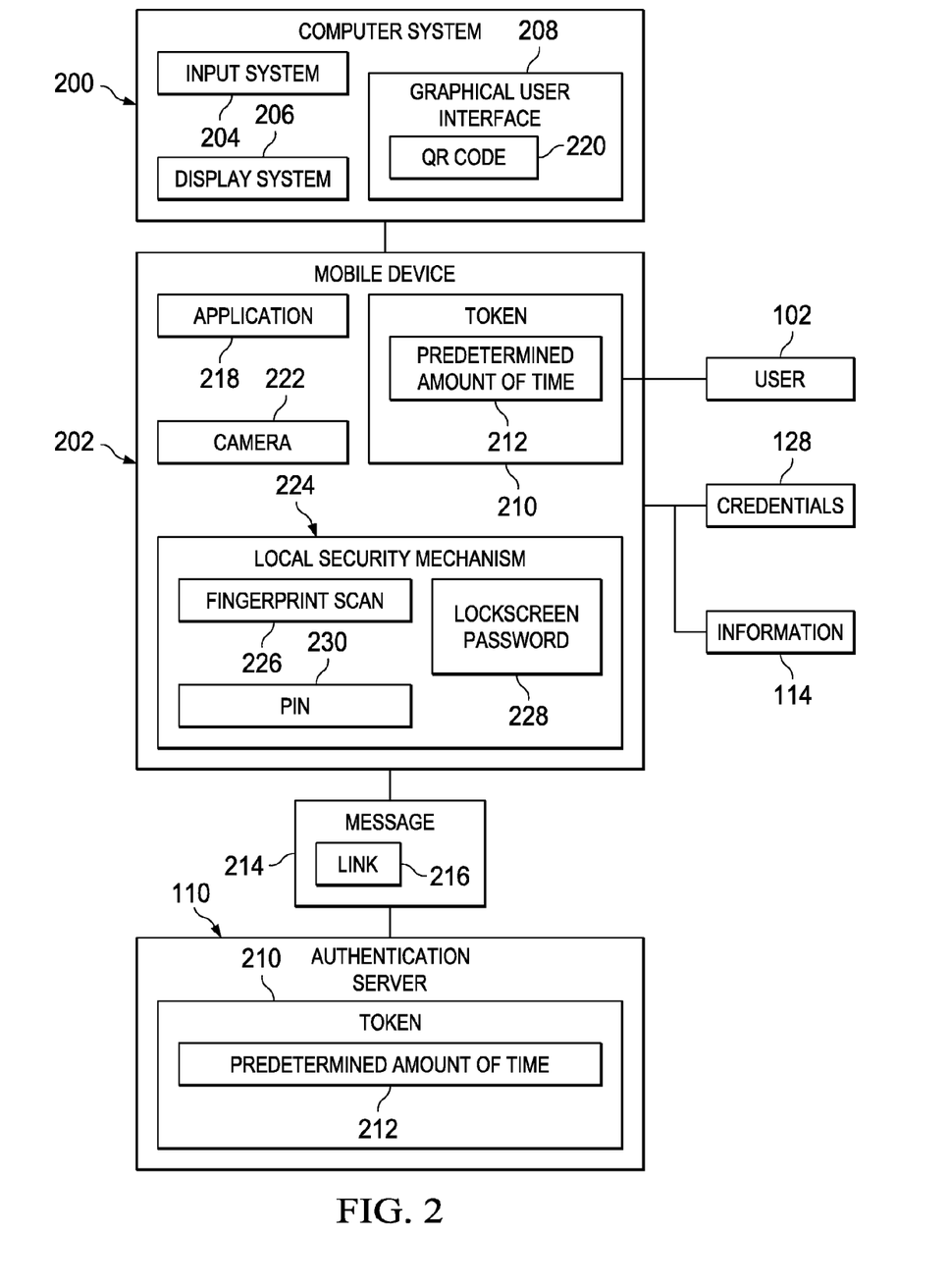
FIG. 2 is an illustration of a block diagram of a computer system in communication with a mobile device in accordance with an illustrative embodiment.

With reference next to FIG. 2, an illustration of a block diagram of a computer system in communication with a mobile device is depicted in accordance with an illustrative embodiment. In this depicted example, computer system 200 is an example of computer system 108 and mobile device 202 is an example of mobile device 106 in FIG. 1. In the illustrative example, computer system 200 authenticates user 102 and transfers registration to mobile device 202.

User 102 uses computer system 200 to authorize user 102, as described above in relation to mobile device 106 of FIG. 1. User 102 may prefer to use computer system 200 that has graphical user interface 208 and display system 206 (e.g., entering text is often easier with graphical user interface 208 and display system 206 than on a mobile device).

Computer system 200 includes input system 204. Input system 204 is a physical hardware system and includes one or more of a mouse, a keyboard, a trackball, a touchscreen, a stylus, or some other suitable type of input device.

Computer system 200 includes display system 206. Display system 206 is a physical hardware system and includes one or more display devices on which graphical user interface 208 may be displayed. Display system 206 includes at least one of a light emitting diode (LED) display, a liquid crystal display (LCD), an organic light emitting diode (OLED) display, or some other suitable device on which graphical user interface 208 can be displayed.

Upon successful verification of credentials 128 of user 102, authentication server 110 generates token 210. Token 210 may be any security token that authorizes user 102 to access information 114. For example, token 210 may be a certificate, a session identifier, a web token, an OAuth token, an open ID, or other suitable types of tokens. Authentication server 110 uses token 210 to transfers registration from computer system 200 to mobile device 202.

Token 210 may include an identifier that uniquely identifies user 102. Token 210 may also include a time stamp indicating when token 210 expires, when token 210 was generated, or a combination of both. Token 210 may be a time-sensitive token such that token 210 expires after predetermined amount of time 212 has elapsed. Predetermined amount of time 212 may be based on risk level 150 of FIG. 1, or a level of sensitivity of information 114. For example, predetermined amount of time 212 may provide a shorter amount of time for information 114 that has a greater level of sensitivity than for information 114 that is less sensitive.

Authentication server 110 sends message 214 to mobile device 202. Message 214 comprises information such that mobile device 202 can access token 210. For example, message 214 may be a dynamically generated message having a unique identifier for the session. Message 214 includes link 216 to token 210 residing on authentication server 110. Link 216 is a dynamically generated uniform resource locator (URL). Link 216 includes information that uniquely identifies the session or token 210. For example, link 216 may include a randomly generated number or string that identifies the session or token 210.

Application 218, running on mobile device 202, accesses link 216 to retrieve token 210 from authentication server 110. Token 210 is then stored on mobile device 202. In various embodiments, a copy of token 210 may also reside on authentication server 110, such that token 210 is available on authentication server 110 and mobile device 202.

Authentication server 110 associates user 102 with mobile device 202 to track devices that the user 102 has authorized. For example, authentication server 110 may employ a database that tracks token 210 and a description of mobile device 202. The database associates the description of mobile device 202 with user profile 132 of FIG. 1, such that the database can be used to retrieve a list of the authorized devices for user 102.

In certain embodiments, computer system 200 presents quick response (QR) code 220 on graphical user interface 208 that represents link 216. QR code 220 may be any type of two-dimensional bar code that is machine-readable. Link 216 is codified in QR code 220. Computer system 200 displays QR code 220 on display system 206.

Mobile device 202 includes camera 222. Application 218 running on mobile device 202 uses camera 222 to scan QR code 220. Application 218 reads QR code 220 to identify link 216 codified in QR code 220. Application 218 then access link 216 to retrieve token 210.

Mobile device 202 comprises local security mechanism 224 inherent to mobile device 202. Mobile device 202 can be locked using a lock screen so that inadvertent or unauthorized use of the mobile device 202 can be avoided or reduced. Local security mechanism 224 allows mobile device 202 to be unlocked such that application 218 can be accessed.

Local security mechanism 224 comprises one or more of fingerprint scan 226, lockscreen password 228, pin 230, or any other suitable type of mechanism for unlocking mobile device 202. Fingerprint scan 226 uses a fingerprint of user 102 to identify user 102. For example, fingerprint scan 226 may be embodied as Touch ID®, provided by Apple Computer Inc. of Sunnyvale Calif. Lockscreen password 228 and pin 230 may be any alphanumeric string of characters that can be used to unlock mobile device 202.

Token 210 enables access to application 218 when local security mechanism 224 is present on mobile device 202. Token 210 authenticates user 102 such that user 102 can access application 218, so that mobile device 202 does not need to authenticate user 102 with authentication server 110. In other words, after user 102 has been successfully authenticated at least once, and token 210 has been issued to mobile device 202, application 218 uses token 210 to authenticate user 102.

Figure 3:
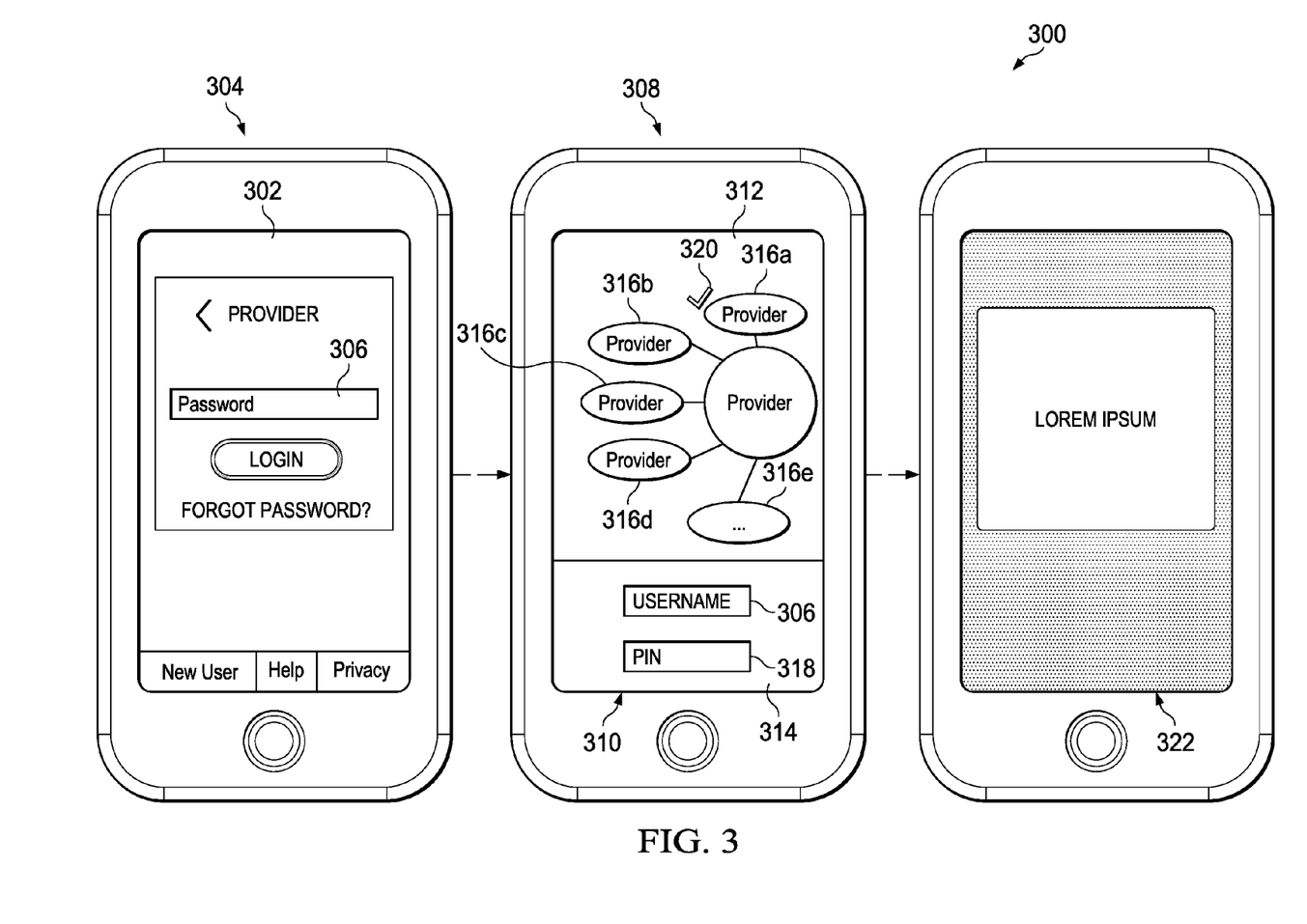
FIG. 3 is an illustration of a user interface in accordance with an illustrative embodiment.

With reference next to FIG. 3, an illustration of a user interface is depicted in accordance with an illustrative embodiment. In this depicted example, mobile device 300 is an example of mobile device 106 in FIG. 1 and user interface 302 is an example of user interface 118 in FIG. 1.

User interface 302 shows first screen 304 having username field 306. User 102 of FIG. 1 enters at least one keyword 138 in FIG. 1, in username field 306. For example, user 102 may enter a name or email address in username field 306.

After user 102 enters keyword 138 in username field 306, user interface 302 then shows second screen 308 showing menu 310. Menu 310 shows federated login menu 312 and direct login menu 314.

Federated login menu 312 shows a number of different identity providers 316*a*, 316*b*, 316*c*, 316*d*, and 316*e* that are capable of providing a federated login such as federated authentication scheme 126 shown in FIG. 1. In other embodiments, more or fewer of identity providers 316 may be shown.

In the illustrated example, federated login menu 312 is designated as favored authentication scheme 142 of FIG. 1. As shown federated login menu 312 is shown ahead of (e.g., on top of) direct login menu 314. In other words, federated login menu 312 is shown before direct login menu 314. Federated login menu 312 is also highlighted to indicate that federated login menu 312 is favored authentication scheme 142. Specifically, as shown, service provider 316*a* is shown with check mark 320 to indicate that service provider 316*a* is the available for user 102 to select based on user profile 132 in FIG. 1. For example, user profile 132 may indicate that identity providers 316*b*, 316*c*, 316*d*, and 316*e* are not allowed based on policy 144 in FIG. 1. In other words, federated login menu 312 filters and identifies services providers 316 that are available to user 102 based on policy 144. As one example, employer preference 152 in FIG. 1 may allow service provider 316*a* while disallowing or filtering out identity providers 316*b*, 316*c*, 316*d*, and 316*e*.

Direct login menu 314 shows options for a direct login, such as with direct authentication scheme 124 shown in FIG. 1. Direct login menu 314 shows username field 306 and pin field 318. In the illustrated example, username field 306 is the same in first screen 304 and second screen 308.

After user 102 logs in via second screen 308, user interface 302 then shows third screen 322. Third screen 322 shows information 114 of FIG. 1 related to user 102.

Figure 4:
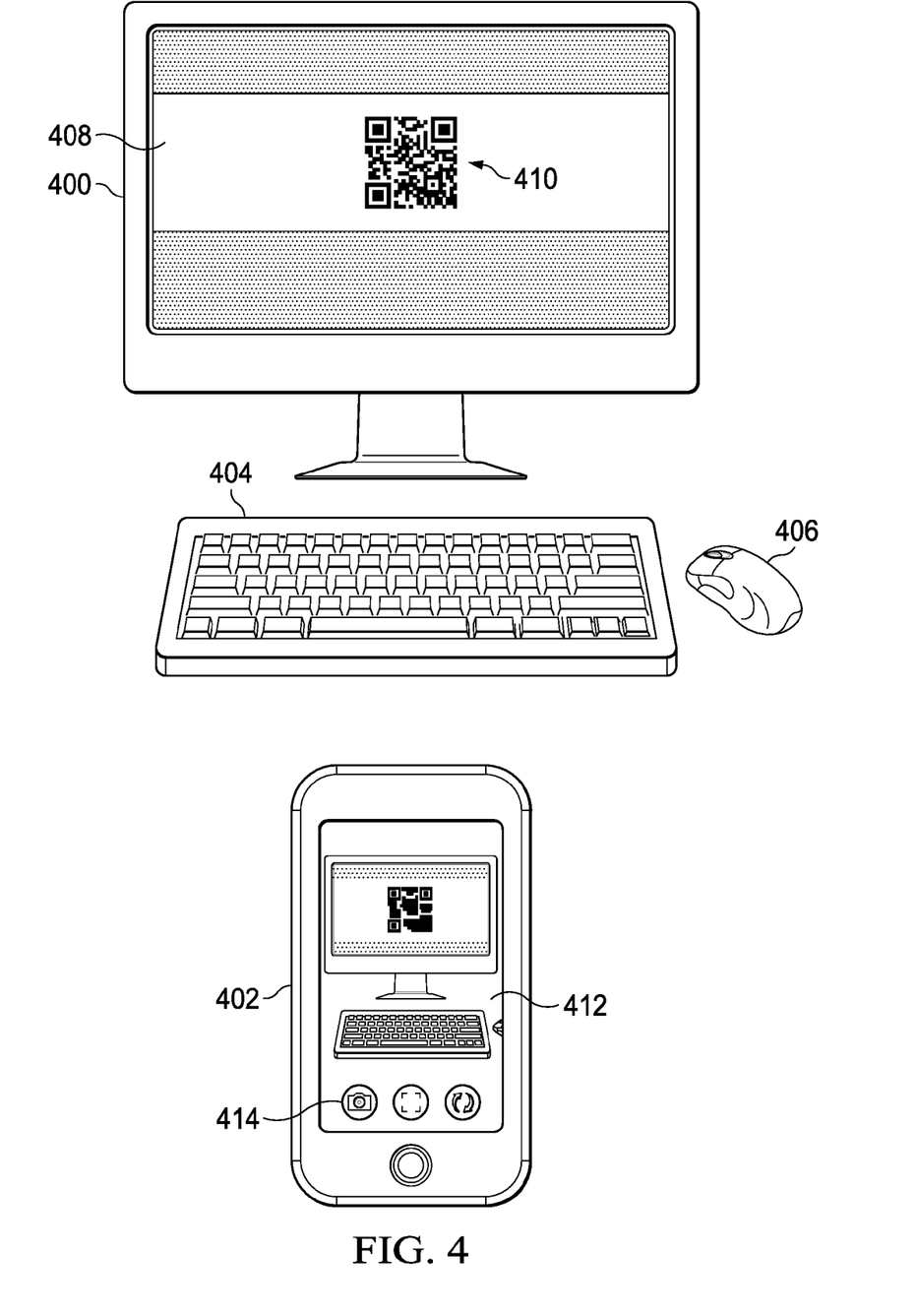
FIG. 4 is an illustration of computer system showing a quick reference code in accordance with an illustrative embodiment.

With reference next to FIG. 4, an illustration of computer system showing a quick reference code is depicted in accordance with an illustrative embodiment. In this depicted example, computer system 400 is an example of computer system 200 shown in FIG. 2 and mobile device 402 is an example of mobile device 202 shown in FIG. 2.

In the illustrated example, computer system 400 includes keyboard 404 and mouse 406. Keyboard 404 and mouse 406 are an example of input system 204 shown in FIG. 2.

Computer system 400 includes display 408. Display 408 is an example of display system 206 shown in FIG. 2. As shown display 408 shows QR code 410. QR code 410 is an example of QR code 220 shown in FIG. 2. QR code 410 is a codified reference to link 216 shown in FIG. 2.

Mobile device 402 includes a camera (not shown in FIG. 4). The camera captures image 412 of QR code 410 shown on display 408. Application 414 runs on mobile device 402 and access the camera to capture image 412. Application 414 processes image 412 to identify QR code 410 and decodes link 216 of FIG. 2, codified in QR code 410.

Figure 5:
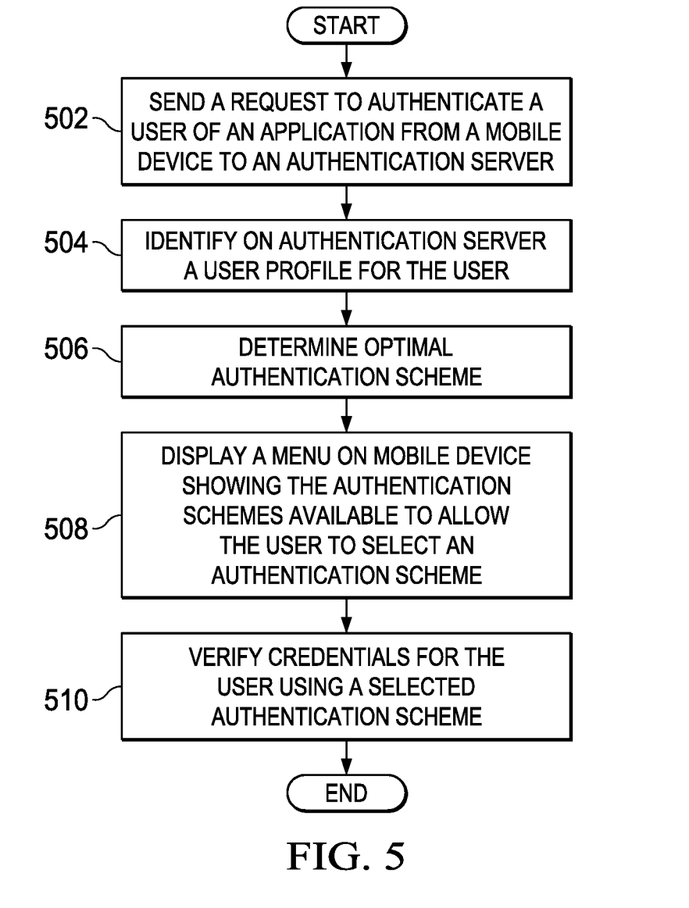
FIG. 5 is an illustration of a flowchart of a method for optimizing authentication for an application on a mobile device in accordance with an illustrative embodiment.

Turning next to FIG. 5, an illustration of a flowchart of a method for optimizing authentication for an application on a mobile device is depicted in accordance with an illustrative embodiment. The process in FIG. 5 may be implemented in authentication mechanism 100 in FIG. 1.

The process begins by sending a request to authenticate a user of the application from the mobile device to an authentication server (step 502). The process then identifies, on the authentication server, a user profile for the user (step 504). The user profile comprises one or more authentication schemes available to authenticate the user. The authentication schemes comprise a direct authentication scheme in which the user provides a password and a federated authentication scheme.

The process then determines, on the authentication server, a favored authentication scheme from the one or more authentication schemes available based on a policy associated with the user profile (step 506).

The process then displays, on the mobile device, a menu showing the authentication schemes available to allow the user to select an authentication scheme (step 508). The favored authentication scheme is displayed ahead of a remainder of the authentication schemes.

The process then verifies, on the authentication server, credentials for the user using the selected authentication scheme to authenticate the user (step 510). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 5 may also display other information in addition to menu shown in step 508.

Figure 6:
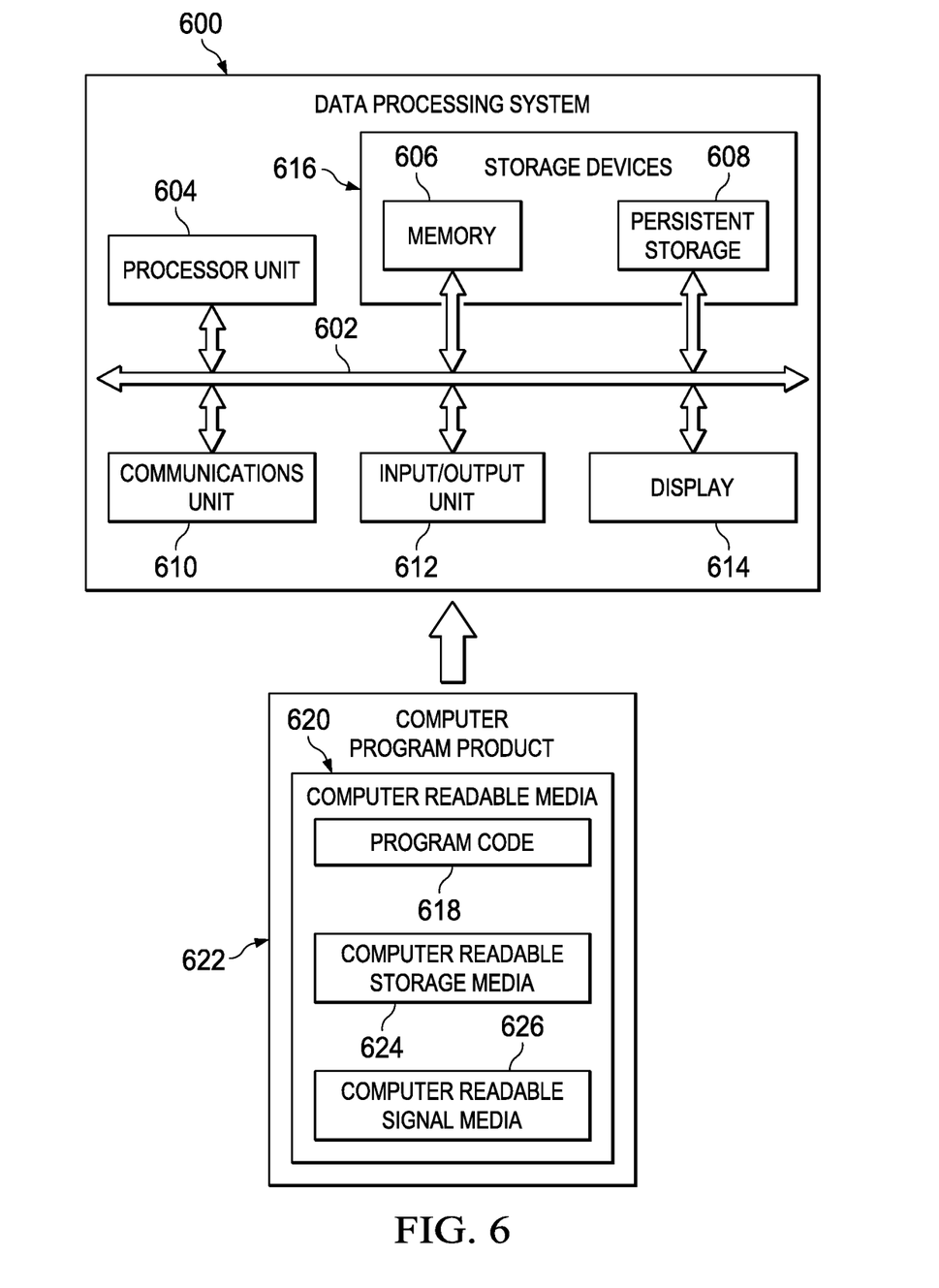
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement mobile device 106, computer system 108, or authentication server 110 in FIG. 1. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid state hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626.

In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of optimizing authentication for an application on a mobile device, the method comprising:
   sending a request to authenticate a user of the application from the mobile device to an authentication server;
   identifying, on the authentication server, a user profile for the user comprising one or more authentication schemes available to authenticate the user, wherein the authentication schemes comprise a direct authentication scheme in which the user provides a password and a federated authentication scheme;
   determining, on the authentication server, a favored authentication scheme from the one or more authentication schemes available based on a policy associated with the user profile;
   displaying, on the mobile device, a menu showing the authentication schemes available to allow the user to select an authentication scheme, wherein the favored authentication scheme is displayed ahead of a remainder of the authentications schemes; and
   verifying, on the authentication server, credentials for the user profile using the selected authentication scheme to authenticate the user.

2. The method of claim 1, wherein the policy is based on one or more of a user preference, an online mode status of the mobile device, a risk level, and an employer preference.

3. The method of claim 1, further comprising:
   generating a token in response to a successful verification of the credentials.

4. The method of claim 3, wherein the token expires after a predetermined amount of time.

5. The method of claim 3, further comprising:
   presenting a quick response (QR) code on a computer system, wherein the QR code presents a dynamically generated link directed the token;
   scanning the QR code using a camera of the mobile device to access the link to the token;
   retrieving the token from the authentication server using the mobile device; and
   storing the token on the mobile device.

6. The method of claim 3, further comprising:
   sending a message from the authentication server to the mobile device, wherein the message contains a link to the token.

7. The method of claim 3, wherein the mobile device further comprises a local security mechanism inherent to the mobile device to enable access to the application when the token is present on the mobile device.

8. The method of claim 7, wherein the local security mechanism comprises one or more of a fingerprint scan, a lock-screen password, or a pin number.

9. The method of claim 6, wherein a local security mechanism is used when the mobile device is in an offline mode of the mobile device such that communication between the mobile device and the authentication server is disrupted, and the favored authentication scheme when the mobile device is in an online mode such that the communication between mobile device and the authentication server is established.

10. The method of claim 1, further comprising:
    sending, via the mobile device, a keyword that is associated with the user to the authentication server, wherein the keyword comprises one or more of a username, an email address, a name of an employer, a client identifier, or a company registration code; and
    determining the user profile for the user based on the keyword.

11. An authentication mechanism for authenticating a user using a favored authentication scheme among options comprising a direct authentication scheme and a federated authentication scheme, comprising:
    a mobile device is configured to send a request to authenticate the user to an authentication server;
    the authentication server is configured to:
      identify a user profile for the user containing one or more authentication schemes available to authenticate the user, wherein the authentication schemes comprise the direct authentication scheme in which the user provides a password and the federated authentication scheme;
      determine the favored authentication scheme from the one or more authentication schemes available based on a policy associated with the user profile;
    the mobile device further configured to display a menu showing the authentication schemes available to allow the user to select an authentication scheme, wherein the favored authentication scheme is displayed ahead of a remainder of the authentication schemes; and
    the authentication server further configured to verify credentials for the user profile using the selected authentication scheme.

12. The authentication mechanism of claim 11, wherein the policy is based on one or more of a user preference, an online mode status of the mobile device, a risk level, and an employer preference.

13. The authentication mechanism of claim 11, further comprising:
    generating a token in response to a successful verification of the credentials.

14. The authentication mechanism of claim 13, wherein the token expires after a predetermined amount of time.

15. The authentication mechanism of claim 13, further comprising:
    presenting a quick response (QR) code on a computer system, wherein the QR code presents a dynamically generated link directed to the token;
    scanning the QR code using a camera of the mobile device to access the link to the token;
    retrieving the token from the authentication server using the mobile device; and
    storing the token on the mobile device.

16. The authentication mechanism of claim 13, further comprising:

sending a message from the authentication server to the mobile device, wherein the message contains a link to the token.

17. The authentication mechanism of claim 13, wherein the mobile device further comprises a local security mechanism inherent to the mobile device to enable access to an application when the token is present on the mobile device.

18. The authentication mechanism of claim 17, wherein the local security mechanism comprises one or more of a fingerprint scan, a lock-screen password, or a pin number.

19. The authentication mechanism of claim 16, wherein a local security mechanism is used when the mobile device is in an offline mode of the mobile device such that communication between the mobile device and the authentication server is disrupted, and the favored authentication scheme when the mobile device is in an online mode such that the communication between mobile device and the authentication server is established.

20. The authentication mechanism of claim 11, further comprising:
sending, via the mobile device, a keyword that is associated with the user to the authentication server, wherein the keyword comprises one or more of a username, an email address, a name of an employer, a client identifier, or a company registration code; and
comparing, the keyword to a list of known users to determine the user profile.

* * * * *